US 10,612,463 B2

United States Patent
Kobayashi et al.

(10) Patent No.: US 10,612,463 B2
(45) Date of Patent: Apr. 7, 2020

(54) GAS TURBINE SYSTEM EQUIPPED WITH VARIABLE SPEED GENERATOR CONNECTED TO ROTARY SHAFT OF LOW-PRESSURE TURBINE OF TWO-SHAFT GAS TURBINE

(71) Applicant: MITSUBISHI HEAVY INDUSTRIES COMPRESSOR CORPORATION, Tokyo (JP)

(72) Inventors: Masahiro Kobayashi, Hiroshima (JP); Takeshi Hataya, Hiroshima (JP); Yasushi Mori, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 15/548,853

(22) PCT Filed: Feb. 9, 2015

(86) PCT No.: PCT/JP2015/053499
§ 371 (c)(1),
(2) Date: Aug. 4, 2017

(87) PCT Pub. No.: WO2016/129030
PCT Pub. Date: Aug. 18, 2016

(65) Prior Publication Data
US 2018/0016976 A1    Jan. 18, 2018

(51) Int. Cl.
*F02C 7/32*    (2006.01)
*H02K 7/18*    (2006.01)
(Continued)

(52) U.S. Cl.
CPC .......... *F02C 3/10* (2013.01); *F02C 7/27* (2013.01); *F02C 7/32* (2013.01); *H02K 7/1823* (2013.01);
(Continued)

(58) Field of Classification Search
CPC .......... F02C 3/10; F02C 7/32; F05D 2220/32; F05D 2220/76; F05D 2260/85; H02K 7/1823
See application file for complete search history.

(56) References Cited

U.S. PATENT DOCUMENTS 9,431,875 B2 *  8/2016  Keogh ............... F02C 3/073
2005/0056021 A1  3/2005  Belokon et al.
(Continued)

FOREIGN PATENT DOCUMENTS

JP  3-253704 A   11/1991
JP  2002-4890 A  1/2002
(Continued)

OTHER PUBLICATIONS

International Search Report and Written Opinion of the International Searching Authority (Forms PCT/ISA/237 and PCT/ISA/210), dated Mar. 24, 2015, for International Application No. PCT/JP2015/053499, with an English translation.

*Primary Examiner* — Tulsidas C Patel
*Assistant Examiner* — S. Mikailoff
(74) *Attorney, Agent, or Firm* — Birch, Stewart, Kolasch & Birch, LLP

(57) ABSTRACT

A gas turbine system (1) is equipped with: a two-shaft gas turbine (2) having a gas turbine compressor (10) that takes in and compresses air (A), a combustor (11) that mixes and burns compressed air (CA) generated by the gas turbine compressor (10) and fuel (F) to generate a combustion gas (CG), a high-pressure turbine (12) that is rotationally driven (Continued)

by the combustion gas (CG), and a low-pressure turbine (13) that is rotationally driven by the combustion gas (CG) after being used to rotationally drive the high-pressure turbine (12); a main compressor (3) that is driven by a rotational driving force from the low-pressure turbine (13) to compress a process gas (PG); a variable speed generator (4) that is provided between the main compressor (3) and the low-pressure turbine (13) and generates electric power by the rotational driving force of the low-pressure turbine (13); an inverter device (5) that is connected to the variable speed generator (4) and converts a frequency and a voltage of electric power (EP1) from the variable speed generator (4); and driven machines (6) that are driven by electric power from the inverter device (5).

6 Claims, 3 Drawing Sheets

(51) Int. Cl.
    *F02C 3/10*         (2006.01)
    *F02C 7/27*         (2006.01)

(52) U.S. Cl.
    CPC ...... *F05D 2220/32* (2013.01); *F05D 2220/76* (2013.01); *F05D 2260/85* (2013.01)

(56) References Cited

U.S. PATENT DOCUMENTS

| | | | |
|---|---|---|---|
| 2006/0150633 A1 | 7/2006 | McGinley et al. | |
| 2010/0019717 A1* | 1/2010 | Bjerknes | F01D 15/10 |
| | | | 318/723 |
| 2012/0000204 A1* | 1/2012 | Kesseli | F02C 3/107 |
| | | | 60/778 |
| 2012/0313372 A1* | 12/2012 | Bjerknes | F01D 15/10 |
| | | | 290/34 |
| 2012/0324903 A1* | 12/2012 | Dewis | F02C 7/143 |
| | | | 60/772 |
| 2015/0171705 A1 | 6/2015 | Hino et al. | |
| 2015/0285089 A1* | 10/2015 | Scarponi | F01D 15/08 |
| | | | 60/772 |
| 2015/0345385 A1* | 12/2015 | Santini | F01D 15/10 |
| | | | 290/52 |
| 2017/0077750 A1* | 3/2017 | Hino | F01D 15/10 |

FOREIGN PATENT DOCUMENTS

| | | | | |
|---|---|---|---|---|
| JP | 2007-505261 A | 3/2007 | | |
| WO | WO 2014/020772 A1 | 2/2014 | | |
| WO | WO 2014/141483 A1 | 9/2014 | | |
| WO | WO 2014141483 A1 * | 9/2014 | ............ | F02C 6/00 |

* cited by examiner

GAS TURBINE SYSTEM EQUIPPED WITH VARIABLE SPEED GENERATOR CONNECTED TO ROTARY SHAFT OF LOW-PRESSURE TURBINE OF TWO-SHAFT GAS TURBINE

TECHNICAL FIELD

The present invention relates to a gas turbine system using a two-shaft gas turbine.

BACKGROUND ART

A single-shaft gas turbine, which obtains a rotational driving force by driving a turbine using a combustion gas generated from compressed air and fuel, has been known from the past.

A compressor, for example, is connected to such a gas turbine so as to generate a compressed fluid, as disclosed in PTL 1.

CITATION LIST

Patent Literature

[PTL 1] Japanese Unexamined Patent Application Publication No. 2002-4890

SUMMARY OF INVENTION

Technical Problem

In the related art described in PTL 1, since the single-shaft gas turbine is used, the compressor (hereinafter, referred to as a main compressor) driven by the gas turbine is rotationally driven at a constant speed (constant rotational speed). In a case where the main compressor is a compressor used in, for example, a plant, the operation conditions of the main compressor depend on the operation conditions of the plant. Therefore, inconvenience may occur if the main compressor is rotationally driven at constant speed. That is, a load required for the main compressor is not constant. Therefore, in a case where the single-shaft gas turbine is used, an additional facility, such as an inlet guide vane, which controls compressor capacity, is required for the main compressor.

The invention provides a gas turbine system capable of coping with operation conditions of a main compressor with a simple configuration.

Solution to Problem

A gas turbine system related to a first aspect of the invention includes a two-shaft gas turbine having a gas turbine compressor that takes in and compresses air, a combustor that mixes and burns the air compressed by the gas turbine compressor and fuel to generate a combustion gas, a high-pressure turbine that is rotationally driven by the combustion gas, and a low-pressure turbine that is rotationally driven by the combustion gas after the high-pressure turbine is rotationally driven; a main compressor that is driven by a rotational driving force from the low-pressure turbine to compress a fluid; a variable speed generator that is provided between the main compressor and the low-pressure turbine and generates electric power by the rotational driving force of the low-pressure turbine; an inverter device that is connected to the variable speed generator and converts a frequency and a voltage of electric power from the variable speed generator; and a driven machine that is driven by electric power from the inverter device.

According to such a gas turbine system, the main compressor is driven using the two-shaft gas turbine in which the high-pressure turbine and the low-pressure turbine are not directly connected together. Therefore, the rotational driving force can be supplied to the main compressor at an arbitrary rotational speed according to a load required in the main compressor. Additionally, by providing the variable speed generator, electric power can be generated irrespective of changes in the rotational speeds of the low-pressure turbine and the main compressor.

Here, the frequency and the voltage of the generated electric power change depending on the rotational speeds of the low-pressure turbine and the main compressor. However, by using the inverter device, the electric power generated by the variable speed generator can be converted into electric power having arbitrary frequency and voltage according to the frequency and the voltage of the electric power required by the driven machine. Therefore, it is possible to drive the driven machine irrespective of the operation conditions (load) of the main compressor, and even if the two-shaft gas turbine is used, the energy obtained by the gas turbine can be effectively utilized.

A second aspect of the invention provides the gas turbine system related to the above first aspect, which may further include a starter motor that is connected to the gas turbine compressor and the high-pressure turbine and rotationally drives the two-shaft gas turbine using the electric power of an external power supply via the inverter device at the start of the two-shaft gas turbine.

In this way, the starter motor is driven by the electric power from the external power supply via the inverter device for driving the driven machine to start the two-shaft gas turbine. For this reason, the existing inverter device for driving the driven machine can be made to serve a double purpose without separately installing an inverter device for the starter motor, and the start of the two-shaft gas turbine can also be performed. As a result, the space of the gas turbine system can be saved. Additionally, since such a new inverter device is unnecessary, the structure of the gas turbine system can be simplified, and it is possible to save maintenance labor and suppress cost increase.

A third embodiment of the invention provides the gas turbine system related to the above second aspect, in which the starter motor may be capable of generating electric power by a rotational driving force of the two-shaft gas turbine, during a steady operation of the two-shaft gas turbine, and the gas turbine system may further comprise a power feed switching part that enables the electric power from the external power supply to be fed to the starter motor via the inverter device at the start, and enables the electric power generated by the starter motor to be fed to the external power supply without passing through the inverter device during the steady operation.

In this way, in addition to using the starter motor for the start of the two-shaft gas turbine, electric power can be generated by a portion of the rotational driving force obtained by the gas turbine during the steady operation. By providing the power feed switching part, the electric power generated by the starter motor can be transmitted to the external power supply by switching a power feed path from the start, during the steady operation of the gas turbine. Therefore, the energy obtained from the two-shaft gas turbine can be more effectively utilized.

A fourth aspect of the invention provides the gas turbine system related to any one of the above first to third aspects, in which the driven machine may have a compressor that compresses the fluid.

In this way, since the driven machine is the compressor, the compressed fluid required for a plant facility or the like can be generated together with the main compressor.

Advantageous Effects of Invention

According to above gas turbine system, by driving the main compressor by the two-shaft gas turbine and installing the variable speed generator and the inverter device in the two-shaft gas turbine, it is possible to cope with the operation conditions of the main compressor with a simple configuration.

DESCRIPTION OF EMBODIMENTS

First Embodiment

Hereinafter, a gas turbine system 1 related to embodiments of the invention will be described.

Figure 1:
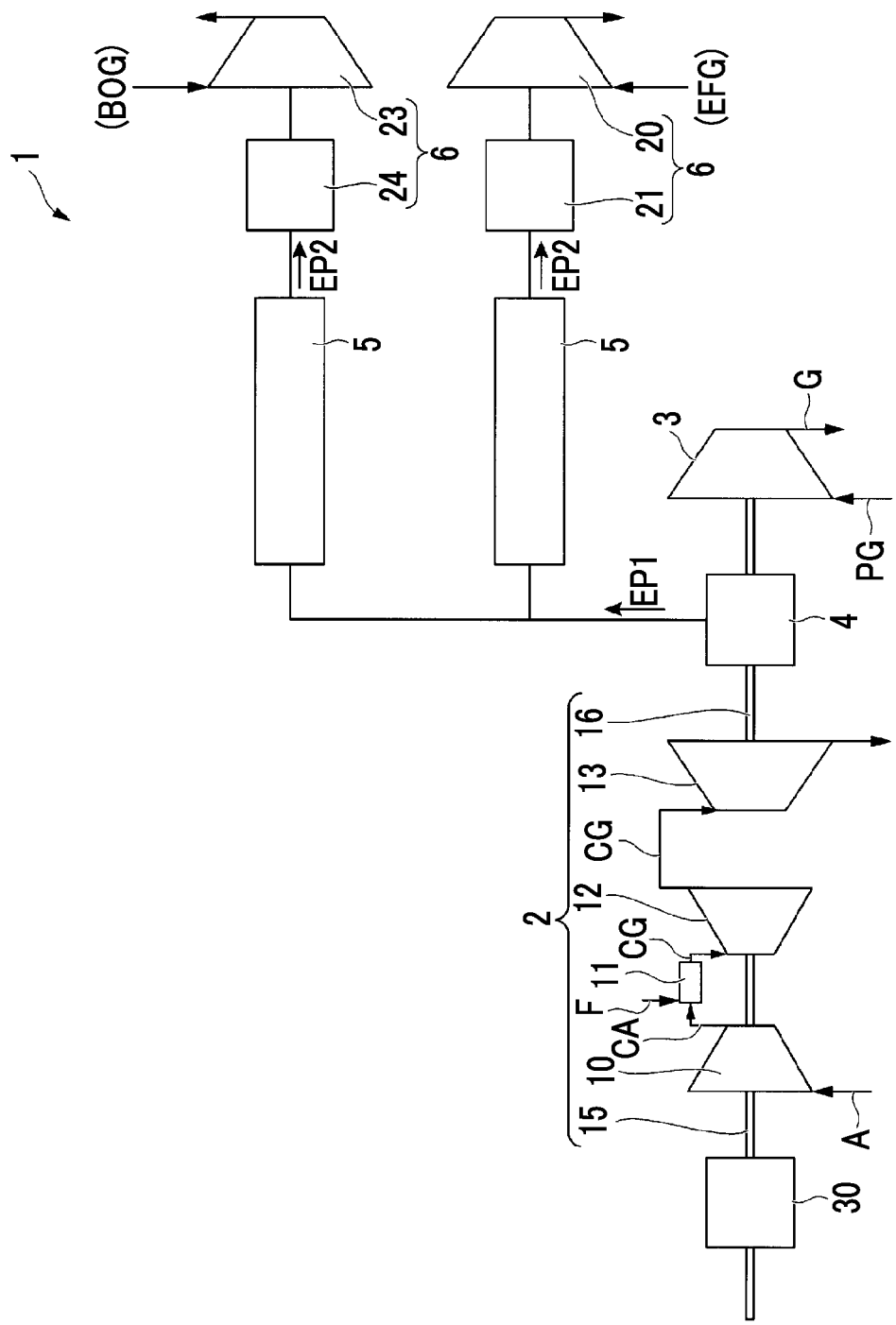
FIG. 1 is an overall configuration view of a gas turbine system in a first embodiment of the invention.

As illustrated in FIG. 1, the gas turbine system 1 is, for example, an apparatus that is used for a liquefied natural gas (LNG) plant or the like and generates a compressed gas G.

The gas turbine system 1 includes a gas turbine 2 that generates a rotational driving force, a main compressor 3 that is driven by the rotational driving force from the gas turbine 2 and compresses a process gas PG (fluid), a variable speed generator 4 that is provided between the main compressor 3 and the gas turbine 2, an inverter device 5 that converts a frequency and a voltage of electric power EP1 from the variable speed generator 4, and a driven machine 6 that is driven by electric power EP2 from the inverter device 5.

The gas turbine 2 has a gas turbine compressor 10 that compresses air A, a combustor 11 that generates a combustion gas CG from compressed air CA compressed and generated by the compressor 20 and fuel F, a high-pressure turbine 12 that is rotationally driven by the combustion gas CG from the combustor 11, and a low-pressure turbine 13 that is rotationally driven by the combustion gas CG after the high-pressure turbine 12 is rotationally driven.

The gas turbine compressor 10 has an axial or centrifugal compressor having a first rotary shaft 15 and a blade member (not illustrated) fixed to the first rotary shaft 15. In the gas turbine compressor 10, the air A taken in from the outside is compressed through the rotation of the first rotary shaft 15 and the above blade member to generate the compressed air CA.

In the combustor 11, the compressed air CA is introduced from the gas turbine compressor 10, and the fuel F is blown in and burned to generate a high-temperature and high-pressure combustion gas CG.

The high-pressure turbine 12 is an axial or centrifugal turbine having the blade member (not illustrated) fixed to the first rotary shaft 15. The high-pressure turbine 12 introduces the combustion gas CG generated in the combustor 11 to rotate the above blade member and the first rotary shaft 15, thereby generating a rotational driving force around the first rotary shaft 15.

The low-pressure turbine 13 is an axial or centrifugal turbine having a second rotary shaft 16 and a blade member (not illustrated) fixed to the second rotary shaft 16. The low-pressure turbine 13 is rotationally driven by the combustion gas CG that is an exhaust gas from the high-pressure turbine 12 to generate a rotational driving force around the second rotary shaft 16.

In this way, the gas turbine 2 is a so-called two-shaft gas turbine 2 in which the first rotary shaft 15 and the second rotary shaft 16 are not directed connected together and makes it possible to adjust the rotational speed of the second rotary shaft 16 according to load while being operated under optimal conditions. Additionally, the first rotary shaft 15 of the gas turbine 2 is provided with an air starter using compressed air, an electric starter (starter motor) using a motor, or the like serving as a starter 30 used at the start.

The main compressor 3 is, for example, a centrifugal or axial compressor for compressing a refrigerant of a refrigerator used in order to liquefy a natural gas serving as the process gas PG in the LNG plant. The main compressor 3 is connected to the second rotary shaft 16 of the low-pressure turbine 13 and has the blade member (not illustrated) fixed to the second rotary shaft 16. The main compressor 3 compresses the process gas PG through the rotation of the second rotary shaft 16 and the above blade member to generate the compressed gas G. A load required in the main compressor 3, that is, a required rotational driving force, is not constant, and fluctuates according to the operation conditions of a plant in which the main compressor 3 is provided.

The variable speed generator 4 is provided on the second rotary shaft 16 between the main compressor 3 and the low-pressure turbine 13 and generates electric power by the rotational driving force of the low-pressure turbine 13. The variable speed generator 4 is an induction generator and generates AC electric power EP1 having different frequency and voltage according to the rotational speed of the second rotary shaft 16, that is, depending on the load required by the main compressor 3.

The inverter device 5 mainly has a converter circuit that converts the AC electric power EP1 from the variable speed generator 4 into DC electric power, and an inverter circuit that converts the DC electric power obtained in the converter circuit into AC electric power EP2 having arbitrary frequency and voltage. In the present embodiment, two inverter devices 5 are electrically connected to the variable speed generator 4.

The driven machine 6 is driven by receiving the electric power EP2 required by itself from each inverter device 5. That is, in the inverter device 5, the electric power EP2 having a frequency and a voltage required for the operation of the driven machine 6 is created on the basis of the electric power EP1 from the variable speed generator 4.

In the present embodiment, driven machines 6 are connected to the respective inverter device 5 one by one.

One driven machine 6 has, for example, a compressor 20 used in order to reuse, an end flash gas (EFG) generated at the last step of the LNG liquefaction of the LNG plant, for the fuel F or the like of the gas turbine 2, and an induction motor 21 that drives this compressor. The other driven machine 6 has, for example, a compressor 23 used in order to reuse a boil-off gas (BOG) gasified within an LNG tank for the fuel F or the like of the gas turbine 2, and an induction motor 24 that drives this compressor.

According to the gas turbine system 1 of the present embodiment described above, the main compressor 3 is driven using the two-shaft gas turbine 2 in which the high-pressure turbine 12 and the low-pressure turbine 13 are not directly connected together. Therefore, while operating the gas turbine 2 under the optimal conditions (rotational speed and the like) that operation efficiency is high, the rotational speed of the low-pressure turbine 13 can be adjusted according to the load required in the main compressor 3, and a rotational driving force can be supplied to the main compressor 3 at an arbitrary rotational speed.

Therefore, while maximizing the capacity of the gas turbine 2, the refrigeration capacity of the refrigerator can be easily adjusted, for example, when the main compressor 3 is used for the compression of the refrigerant in the refrigerator of the LNG plant.

Moreover, even in the two-shaft gas turbine 2, by providing the variable speed generator 4, electric power can be generated irrespective of changes in the rotational speeds of the low-pressure turbine 13 and the main compressor 3 (the rotational speed of the second rotary shaft 16).

The frequency of the electric power EP1 generated by the variable speed generator 4 changes depending on the rotational speeds of the low-pressure turbine 13 and the main compressor 3. However, by using the inverter devices 5, the electric power generated by the variable speed generator 4 can be converted into the electric power EP2 having arbitrary frequency and voltage according to the frequency and the voltage of the electric power required by the driven machines 6.

Therefore, it is possible to drive the driven machines 6 irrespective of the operation conditions (load) of the main compressor 3, and even if the two-shaft gas turbine 2 is used, the energy obtained by the gas turbine 2 can be effectively utilized.

In this way, in the present embodiment, by installing the variable speed generator 4 and the inverter devices 5 in the two-shaft gas turbine 2, it is possible to cope with the operation conditions of the main compressor 3 with a simple configuration.

In the present embodiment, the numbers of inverter devices 5 and driven machines 6 are not limited.

Additionally, devices (for example, motors or the like) other than the compressor 20 may be provided as the driven machines 6.

Second Embodiment

Figure 2:
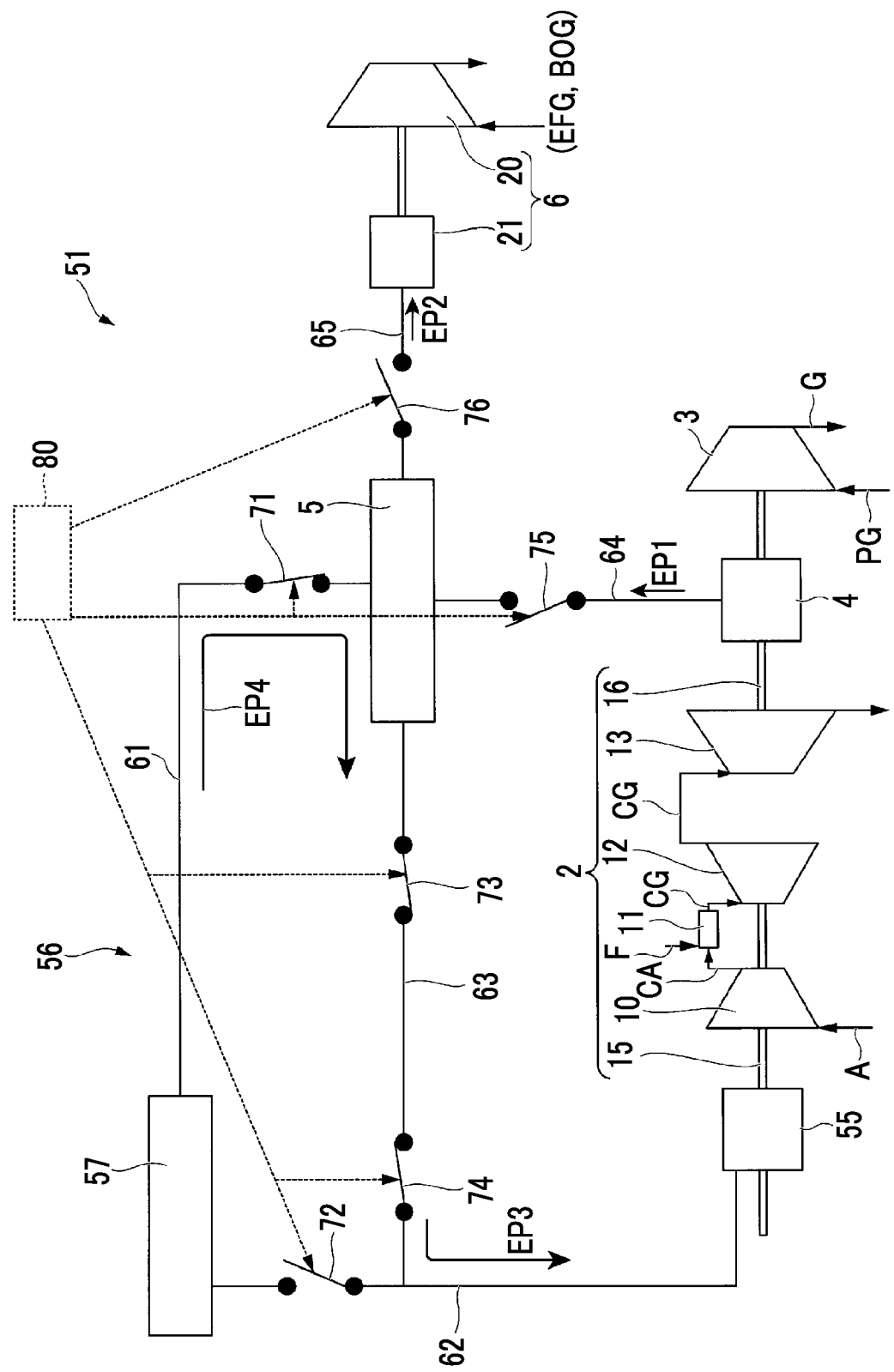
FIG. 2 is an overall configuration view of a gas turbine system in the second embodiment of the invention and is a view illustrating the state of a gas turbine at the start.
Figure 3:
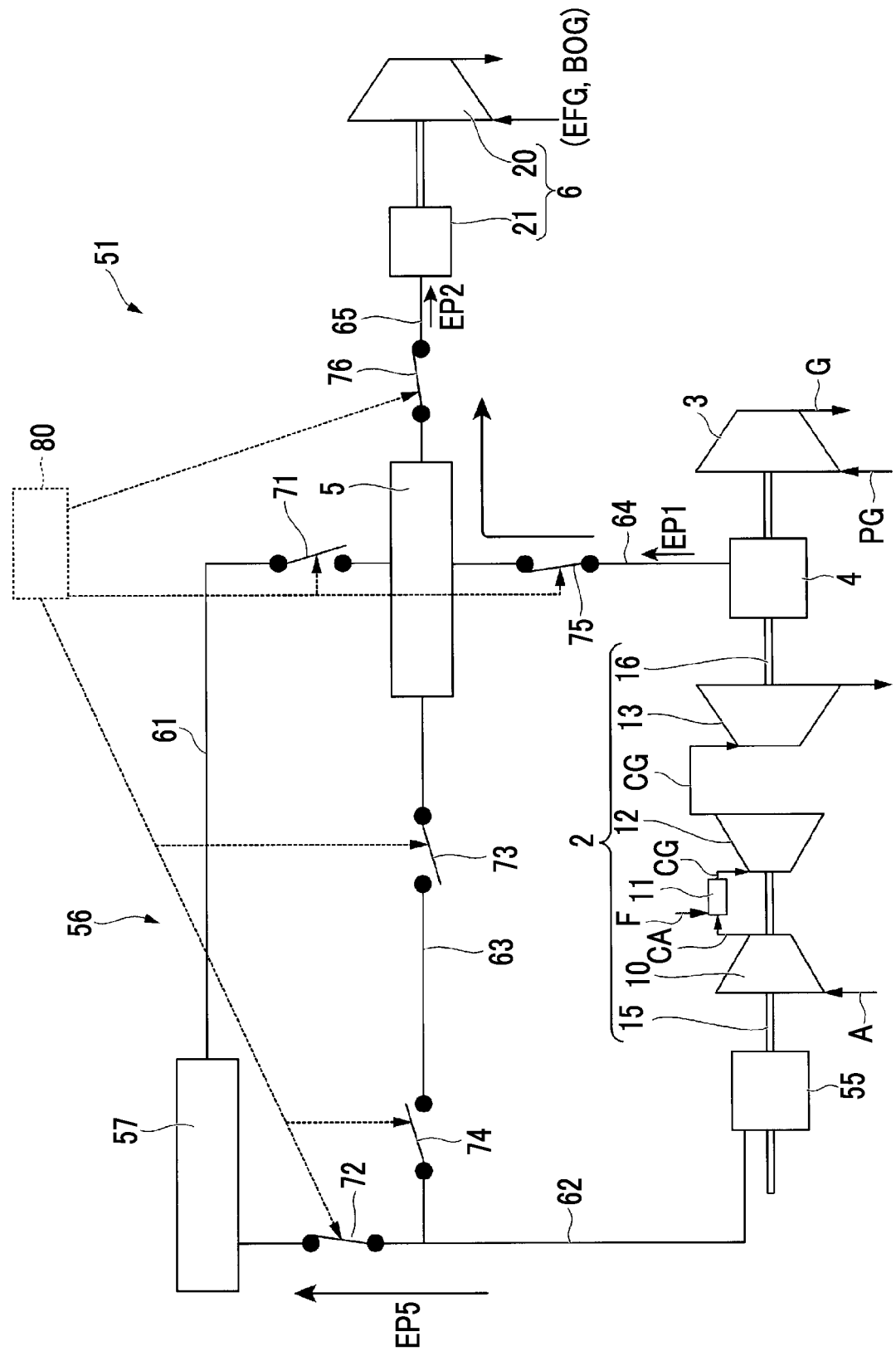
FIG. 3 is an overall configuration view of a gas turbine system in a second embodiment of the invention and is a view illustrating the state of the gas turbine during a steady operation.

Next, a second embodiment of the invention will be described with reference to FIGS. 2 and 3.

The same constituent elements as those of the first embodiment will be designated by the same reference signs, and the detailed description thereof will be omitted.

A gas turbine system 51 of the present embodiment is different from that of the first embodiment in terms of further including a starter motor 55 serving as the starter, and a power feed switching part 56 that enables electric power EP3 to be supplied to the starter motor 55. Additionally, in the present embodiment, one inverter device 5 and one driven machine 6 are provided.

The starter motor 55 is an induction motor that is rotatable at a constant speed, is connected to the first rotary shaft 15 of the gas turbine 2, and generates the rotational driving force that rotates the first rotary shaft 15 at the start of the gas turbine 2.

The power feed switching part 56 is a power circuit that enables AC electric power EP3 to be supplied from an external power supply 57, which is a plant facility, a commercial power supply, or the like other than the gas turbine 2, to the starter motor 55.

In detail, the power feed switching part 56 has a power supply-inverter line 61 that enables the external power supply 57 and the inverter device 5 to be electrically connected together, a power supply-motor line 62 that enables the external power supply 57 and the starter motor 55 to be electrically connected together, and an inverter-motor line 63 that enables a halfway position of the power supply-motor line 62 and the inverter device 5 to be electrically connected together.

Additionally, the power feed switching part 56 has a power supply-inverter switch 71 that is provided in the power supply-inverter line 61 and is capable of switching ON/OFF of the electrical connection in the line 61, a power supply-motor switch 72 that is provided in the power supply-motor line 62 and is capable of switching ON/OFF of the electrical connection in the line 62, and a first inverter-motor switch 73 and a second inverter-motor switch 74 that are provided in the inverter-motor line 63 and are capable of switching ON/OFF of the electrical connection in the line 63.

The first inverter-motor switch 73 is provided closer to the inverter device 5 side than the second inverter-motor switch 74. Additionally, the power supply-motor switch 72 is provided closer to the external power supply 57 side than a position where the inverter-motor line 63 is connected to the power supply-motor switch 72.

Additionally, between the variable speed generator 4 and the inverter device 5, a generator-inverter line 64 capable of electrically connecting these together is provided. A generator-inverter switch 75 is provided in the generator-inverter line 64 and makes it possible to switch ON/OFF of the electrical connection in the line 64.

Between the inverter device 5 and the induction motor 21 of the driven machine 6, a machine-inverter line 65 capable of electrically connecting these together is provided driven. The driven machine-inverter switch 76 is provided in the driven machine-inverter line 65 and makes it possible to switch ON/OFF of the electrical connection in the line 65.

Next, the operation of switching the respective switches at the start of the gas turbine 2 will be described with reference to FIG. 2.

At the start of the gas turbine 2, the generator-inverter switch 75 and the driven machine-inverter switch 76 are turned off. The generator-inverter switch 75 and the driven machine-inverter switch 76 operate in an interlocking manner.

Moreover, the power supply-inverter switch 71 and the first inverter-motor switch 73 are turned on. The power supply-inverter switch 71 and the first inverter-motor switch 73 operate in an interlocking manner.

Additionally, the power supply-motor switch 72 is turned off, and the second inverter-motor switch 74 is turned on. The power supply-motor switch 72 and the second inverter-motor switch 74 operate in an interlocking manner.

The switching operation of these switches is performed by using a control unit 80 or is manually performed.

Next, the operation of switching the respective switches during a steady operation of the gas turbine 2 will be described with reference to FIG. 3. Here, the expression "during a steady operation" indicates that the second rotary shaft 16 of the gas turbine 2 is brought into a load-operable state.

During the steady operation of the gas turbine 2, the generator-inverter switch 75 and the driven machine-inverter switch 76 are turned on.

Additionally, the power supply-inverter switch 71 and the first inverter-motor switch 73 are turned off.

Moreover, the power supply-motor switch 72 is turned on and the second inverter-motor switch 74 is turned off.

In this way, by operating the switches so as to be brought into different states at the start of the gas turbine 2 and during the steady operation, respectively, the power feed switching part 56 sets the electric power EP4 from the external power supply 57 to the electric power EP3 via the inverter device 5 and makes it possible to feed electric power to the starter motor 55, at the start of the gas turbine 2.

Additionally, during the steady operation of the gas turbine 2, the starter motor 55 makes it possible to generate electric power by the rotational driving force of the gas turbine 2. Then, during the steady operation, the power feed switching part 56 makes it possible to feed electric power EP5 from the starter motor 55 to the external power supply 57 without passing through the inverter device 5.

According to the gas turbine system 51 of the present embodiment described above, the electric power EP4 from the external power supply 57 is caused to pass through the inverter device 5 for driving the driven machine 6 to generate the electric power EP3, and the starter motor 55 is driven by the electric power EP3 to start the gas turbine 2. For this reason, the existing inverter device 5 can be made to serve a double purpose without newly installing an inverter device for the starter motor 55, and the start of the gas turbine 2 can also be performed.

As a result, a space for the gas turbine system 51 can be saved compared to a case where an exclusive inverter device for the starter motor 55 is provided. Additionally, since such a new inverter device is unnecessary, the structure of the gas turbine system 51 is simplified. Therefore, it is possible to save maintenance labor and suppress cost increase.

In addition to using the starter motor 55 for the start of the two-shaft gas turbine 2, electric power can be generated by a portion of the rotational driving force obtained by the gas turbine 2 during the steady operation. By providing the power feed switching part 56, the electric power EP5 generated by the starter motor 55 can be transmitted to the external power supply 57 by switching a power feed path from the start, during the steady operation of the gas turbine 2.

Therefore, the energy obtained from the gas turbine 2 can be more effectively utilized.

In the present embodiment, although the inverter-motor line 63 is provided with the two switches of the first inverter-motor switch 73 and the second inverter-motor switch 74, one switch may serve both functions.

Although the embodiments of the invention have been described above in detail with reference to the drawings, the respective components, combinations thereof, or the like in the embodiments are exemplary. Additions, omissions, substitutions, and other modifications of the components can be made without departing from the spirit of the invention. Additionally, the invention is not limited by the embodiments and is limited only by the scope of the claims.

INDUSTRIAL APPLICABILITY

In the above gas turbine system, by installing the variable speed generator and the inverter device in the two-shaft gas turbine, it is possible to cope with the operation conditions of the main compressor with a simple configuration.

REFERENCE SIGNS LIST

1: GAS TURBINE SYSTEM
2: GAS TURBINE
3: MAIN COMPRESSOR
4: VARIABLE SPEED GENERATOR
5: INVERTER DEVICE
6: DRIVEN MACHINE
10: GAS TURBINE COMPRESSOR
11: COMBUSTOR
12: HIGH-PRESSURE TURBINE
13: LOW-PRESSURE TURBINE
15: FIRST ROTARY SHAFT
16: SECOND ROTARY SHAFT
20, 23: COMPRESSOR
21, 24: INDUCTION MOTOR
30: STARTER
51: GAS TURBINE SYSTEM
55: STARTER MOTOR
56: POWER FEED SWITCHING PART
57: EXTERNAL POWER SUPPLY
61: POWER SUPPLY-INVERTER LINE
62: POWER SUPPLY-MOTOR LINE
63: INVERTER-MOTOR LINE
64: GENERATOR-INVERTER LINE
65: DRIVEN MACHINE-INVERTER LINE
71: POWER SUPPLY-INVERTER SWITCH
72: POWER SUPPLY-MOTOR SWITCH
73: FIRST INVERTER-MOTOR SWITCH
74: SECOND INVERTER-MOTOR SWITCH
75: GENERATOR-INVERTER SWITCH
76: DRIVEN MACHINE-INVERTER SWITCH
80: CONTROL UNIT
A: AIR
CA: COMPRESSED AIR
CG: COMBUSTION GAS
PG: PROCESS GAS (FLUID)
G: COMPRESSED GAS
F: FUEL
EP1, EP2, EP3, EP4, EP5: ELECTRIC POWER

The invention claimed is:

1. A gas turbine system for use in a plant for compressing a process fluid, the system comprising:
a two-shaft gas turbine having a gas turbine compressor that takes in and compresses air, a combustor that mixes and burns the air compressed by the gas turbine compressor with fuel to generate a combustion gas,
a high-pressure turbine including a first rotary shaft that is rotationally driven by the combustion gas, and
a low-pressure turbine including a second rotary shaft which is disposed apart from the first rotary shaft and which is rotationally driven by the combustion gas after the high-pressure turbine is rotationally driven;
a main compressor which includes a blade member fixed to the second rotary shaft of the low-pressure turbine, wherein the main compressor is configured to compress a first process fluid by a rotation of the second rotary shaft and the blade member, and the main compressor is provided in the plant;
a variable speed generator provided on the secondary rotary shaft between the main compressor and the low-pressure turbine, the variable speed generator generating an electric power by a rotational driving force of the second rotary shaft and being configured to vary a frequency and a voltage of the electric power according to a rotational speed of the second rotary shaft to correspond to an operation condition of the plant;

an inverter device that is connected to the variable speed generator and converts the frequency and the voltage of the electric power from the variable speed generator, the inverter device comprising an inverter circuit and a converter circuit; and a driven machine that is driven by electric power from the inverter device, wherein, in the two-shaft gas turbine, the rotational speed of the second rotary shaft is able to be adjusted to correspond to the operation condition, by adjusting at least one of a supply amount of the air and a supply amount of the fuel, wherein the main compressor is not fluidically connected to either of the high pressure turbine or the low pressure turbine.

2. The gas turbine system according to claim 1, further comprising:

a starter motor that is connected to the first rotary shaft and rotationally drives the two-shaft gas turbine using electric power of an external power supply through the inverter device at a starting up of the two-shaft gas turbine.

3. The gas turbine system according to claim 2, wherein the starter motor is capable of generating electric power by a rotational driving force of the two-shaft gas turbine, during a steady operation of the two-shaft gas turbine in which the two-shaft gas turbine is capable of driving the main compressor, and wherein the gas turbine system further comprises a power feed switching part that feeds the electric power from the external power supply to the starter motor via the inverter device at the starting up of the two-shaft gas turbine, and feeds the electric power generated by the starter motor to the external power supply during the steady operation.

4. The gas turbine system according to claim 1, wherein the driven machine has a compressor that compresses a second fluid, and the compressor is provided separately from the main compressor.

5. The gas turbine system according to claim 2, wherein the driven machine has a compressor that compresses a second fluid, and the compressor is provided separately from the main compressor.

6. The gas turbine system according to claim 3, wherein the driven machine has a compressor that compresses a second fluid, and the compressor is provided separately from the main compressor.

* * * * *